Inventors:
Floyd A. Hummel
James F. Sarver
Eric R. Kreidler
by Richard H. Burgess
Their Attorney PHOTOLUMINESCENCE AS A FUNCTION OF $Mn^{+2}$ CONCENTRATION.
COMPOSITION: $(Zn_{.795-x}Mg_{.20}Mn_x)_2GeO_4$ CATHODOLUMINESCENCE AS A FUNCTION OF $Mn^{+2}$ CONCENTRATION.
COMPOSITION: $(Zn_{.795-x}Mg_{.20}Mn_x)_2GeO_4$ Inventors:
Floyd A. Hummel
James F. Sarver
Eric R. Kreidler
by Richard H. Burgess
Their Attorney United States Patent Office 3,458,452
Patented July 29, 1969

3,458,452
LUMINESCENT MATERIALS OF ZINC MAGNESIUM GERMANATE ACTIVATED WITH MANGANESE
Floyd A. Hummel, State College, Pa., and James F. Sarver, Cleveland, and Eric R. Kreidler, Woodmere, Ohio, assignors to General Electric Company, a corporation of New York
Filed Jan. 25, 1967, Ser. No. 611,603
Int. Cl. C09k *1/54*
U.S. Cl. 252—301.6      4 Claims

ABSTRACT OF THE DISCLOSURE

Luminescent materials of zinc magnesium germanate in which from 10 to 38 mole percent magnesium can be substituted for zinc and up to 75 mole percent $SiO_2$ can be substituted for $GeO_2$, and in which activator proportions of manganese are substituted for zinc are found to be efficient and very bright in response to ultraviolet radiation of 2537 angstrom unit (A.) wavelength and cathode rays, and they are useful in lamps and cathode-ray tube applications.

BACKGROUND OF THE INVENTION

The present invention relates to solid solution luminescent materials useful as phosphors and having the willemite-type or phenacite-type structure. More particularly, it relates to such materials based on zinc magnesium orthogermanate activated with manganese, $(Zn,Mg)_2GeO_4:Mn$. This notation indicates a crystalline phosphor of zinc magnesium germanate with the material considered to be the activator given after the colon. The manganese acts as an activator in zinc germanate and actually provides the centers at which light is produced in the crystal matrix. Similar notations are used in the same way with other phosphors.

Phosphors based on beryllium orthogermanate $$(Be_2GeO_4)$$

reacted with zirconium, titanium and thorium and activated by manganese are known to be cathodoluminescent. Also, materials based on germanium dioxide and activated with a material selected from the group consisting of manganese chloride, zinc chloride, cadmium chloride, antimony chloride, phosphorus pentoxide and the combination of phosphorus pentoxide and manganese chloride in certain proportions are known to be capable of producing light. Furthermore, $Zn_2SiO_4:Mn$ is a well known cathodoluminescent material, and samples of it certified as standards are supplied by the United States National Bureau of Standards for use in measuring light output of cathodoluminescent phosphors. However, it is a constant goal in the phosphor industry to produce materials of improved efficiency and greater light output and which can be produced in different desirable colors dependent on composition.

Orthogermanates including

$Zn_2GeO_4:Mn$ and $Mg_2GeO_4:Mn$ are known; however, they do not have all of the luminescence characteristics desired for some applications.

Related publications include "Solid Solubility and Eutectic Temperature in the System $Zn_2SiO_4$—$Mg_2SiO_4$" by J. F. Sarver and F. A. Hummel, 45 J. Amer. Ceramic Soc., No. 6, p. 304 (June 1962); and "Subsolidus Equilibria and Luminescence Data on Phases in the System $MgO$—$GeO_2$—$SiO_2$—$TiO_2$" by J. F. Sarver and F. A. Hummel, 110 J. Electrochem. Soc., No. 7, pp. 726–732 (July 1963).

Despite the fact that related compounds are known, the abilities of a specific crystal matrix in combination with certain activators to produce light, and particularly to produce light of desired colors and high brightnesses and efficiencies are not generally predictable but must be studied empirically. Of the infinite possible permutations of matrix compositions and activators only certain types will luminesce, and a much smaller number will be suitable for production of light in useful devices. Empirical studies and invention are often necessary to discover such suitable phosphors and to determine desired compositions and proportions.

SUMMARY

A basic object of the present invention is to provide novel and superior phosphors suitable for photoluminescent and cathodoluminescent applications.

Further objects and advantages of the invention will appear from the following detailed description of species thereof and from the accompanying drawings.

Briefly stated, the present invention in certain of its embodiments provides phosphors having approximately the formula $$(Zn_{a-x-y}Mg_y)_2(Ge_{1-z}Si_z)O_4:Mn_{2x}$$

wherein: $a$ is in the range of about 0.95–1.0, $x$ is in activator proportions and preferably is in the range of about 0.005–0.04, $y$ is in the range of about 0.10–0.38, and $z$ is in the range of about 0–0.75. This means that activator proportions of Mn are substituted in the solid solution lattice for Zn, and Si can be substituted in amounts up to 75 mole percent for Ge and still retain the basic characteristics of the invention. Mg can be substituted for Zn in amounts up to 38 mole percent without causing the appearance of a second phase (a zinc magnesium orthogermanate solid solution having the olivine-type structure), the avoidance of which is necessary for the advantages of the invention. Beyond 38 mole percent magnesium, the hexagonal willemite solid solution matrix is diluted by the orthorhombic olivine-type structure, similar to the natural mineral $(Mg,Fe)_2SiO_4$, which does not produce the luminescent characteristics of the invention.

Other embodiments of the invention include a phosphor having the formula

$$(Zn_{a-x-y}Mg_y)_2GeO_4:Mn_{2x}$$

with the same values for $a$, $x$ and $y$ but with no Si substitution for Ge. Optimum phosphors for excitation by 2537 A. and cathode rays have approximately the composition $$(Zn_{0.84}Mg_{0.15})_2GeO_4:Mn_{0.01}$$

BRIEF DESCRIPTION OF THE DRAWINGS

FIG. 1 is a graphic representation of the brightnesses in response to cathode-ray and 2537 A. excitation of

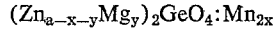

$$(Zn,Mg)_2GeO_4:Mn_{0.01}$$

phosphors showing improvements over prior art

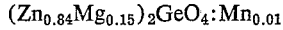

$$Zn_2GeO_4—Mn$$

phosphors.

Figure 2:
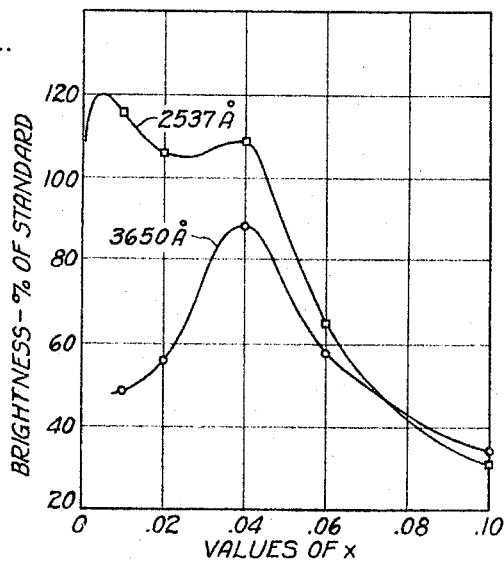

FIG. 2 is a graphical representation of brightness and color or peak wavelength of light produced by phosphors of the invention containing varying proportions of manganese activator in response to excitation by the 2537 A. and 3650 A. line spectra of low pressure and high pressure mercury arcs, respectively.

Figure 3:
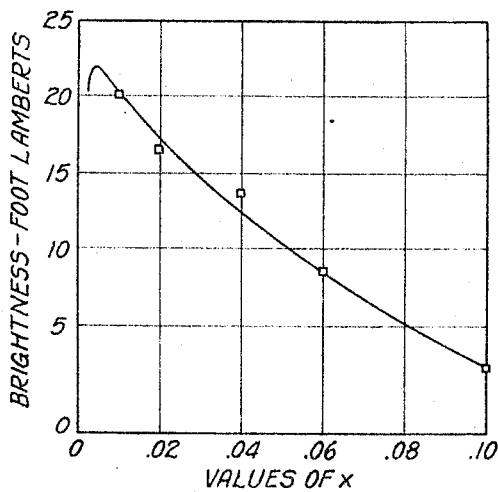

FIG. 3 is a similar graphic representation of brightness and peak wavelength of a phosphor of the invention with varying contents of manganese activator in response to cathode-ray excitation.

In both FIGS. 2 and 3, the phosphor base in which the manganese is varied can be described as approximately

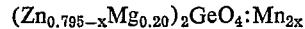

$$(Zn_{0.795-x}Mg_{0.20})_2GeO_4:Mn_{2x}$$

with the manganese content varied from about one mole percent to ten mole precent ($x=0.01$ to $0.1$).

DESCRIPTION OF THE PREFERRED EMBODIMENTS

Applicants have discovered that certain phosphors having the willemite structure and which are solid solutions of zinc orthogermanate and magnesium orthogermanate, activated with manganese, make quite efficient and very bright phosphors which produce light peaking at desirable wavelengths. Such phosphors optionally also contain zinc orthosilicate and magnesium orthosilicate in solid solution, activated with manganese. Rather than presenting merely a proportional decrease or increase in brightness as magnesium germanate is added to the basic zinc germanate matrix, unexpected increases in brightness were found in the solid solution region having basically the willemite structure. This includes up to 38 mole percent magnesium orthogermanate at 1100° C. Likewise, the solid solution limit of magnesium orthosilicate in zinc orthosilicate is about 38% at 1200° C. Beyond 38% of the magnesium compound, the willemite phase is diluted with the olivine phase which is decidedly inferior in light production. Thus, applicants have discovered unexpectedly desirable properties in the binary and quaternary solid solution compositions of these materials with properties which are decidedly superior to those of the individual end members, $Zn_2GeO_4$:Mn, $Mg_2GeO_4$:Mn, $Zn_2SiO_4$:Mn, and $Mg_2SiO_4$:Mn.

It was found that $Mg_2GeO_4$ in solid solution in $$Zn_2GeO_4$$

stabilizes the phosphor and aids in reducing burning by cathode rays.

$Zn_2SiO_4$, when activated with divalent manganese, $Mn^{+2}$, yields a bright green phosphor. Related binary and quaternary phosphors have now been found to be superior.

The examples tested by applicants will be presented in tables below. Phosphors represented in the tables were made using the following raw materials. Phosphor grade materials were used except where chemically pure (C.P.) grade is indicated.

(a) Silicic acid, $SiO_2 \cdot xH_2O$
(b) Basic magnesium carbonate, $$3MgCO_3 \cdot Mg(OH)_2 \cdot 3H_2O$$

C.P.
(c) Zinc oxide, ZnO
(d) Germanium dioxide, $GeO_2$
(e) Manganous carbonate, $MnCO_3$.

As can be seen from the tables below, the compositions were made slightly deficient in ZnO in order to guarantee absence of free ZnO in the finished products.

The ingredients were mixed by hand under acetone and then fired for 20 hours at 900° C. in a silicon carbide resistance furnace to drive off volatiles and initiate reaction. The samples were then ground again under acetone in an automatic agate mortar and pestle and fired at 1100° C. for an additional 20 hours. After a second grinding, the samples were fired a third time at 1175–1200° C., followed by 30 minutes of grinding in an automatic mortar and pestle. All of the firing was done in air in uncovered platinum crucibles.

X-ray diffraction analysis indicated that the samples were completely reacted to form willemite solid solutions. Spectral distribution curves and brightnesses were obtained for each sample under excitation by 2537 A. ultraviolet light and cathode-ray excitation. In the cathode-ray measurements of the quaternary phosphors the current density of the electron beam was 0.5 microamperes per square centimeter, and the anode potential was 16.0 kilovolts. The results are presented in Tables I and II for silicon and magnesium variations in zinc orthogermanate phosphors containing 2 mole percent manganese. In these tables and in subsequent Tables III, IV and V, two values are given for each composition. First is the brightness of the sample, given in Tables I and II as a percent of an arbitrary standard, and the second value is the peak wavelength given in angstrom units and enclosed in parentheses. The peak wavelengths were determined from spectroradiometer curves at 75% of peak intensity.

TABLE I.—2537 A. EXCITATION

[Luminescence of $(Zn_{0.985-y}Mg_y)_2(Ge_{1-z}Si_z)O_4$:$Mn_{0.02}$ as a function of Mg ($y$) and Si ($z$) concentrations—brightness and peak wavelength]

| Values of $z$ | Values of $y$ | | | | | | |
|---|---|---|---|---|---|---|---|
|  | 0 | 0.075 | 0.15 | 0.20 | 0.225 | 0.30 | 0.35 |
| 1.00 | 70.8% (5,290 A.) | | | | | 58.5% (5,270 A.) | |
| 0.75 | | 92(5,320) | | | | 80.0(5,330) | |
| 0.50 | | | 95.0(5,360) | | | 94.3(5,360) | |
| 0.25 | | | | | 94.0(5,380) | 95.5(5,380) | 95.0(5,370) |
| 0 | | 108.0(5,395) | | 115.5(5,400) | | 101.1(5,390) | 104.5(5,380) |

TABLE II.—CATHODE-RAY EXCITATION

[Luminescence of $(Zn_{0.985-y}Mg_y)_2(Ge_{1-z}Si_z)O_4$:$Mn_{0.02}$ as a function of Mg ($y$) and Si ($z$) concentrations—brightness and peak wavelength]

| Values of $z$ | Values of $y$ | | | | | | |
|---|---|---|---|---|---|---|---|
|  | 0 | 0.075 | 0.15 | 0.20 | 0.225 | 0.30 | 0.35 |
| 1.00 | 45.1 ft. 1. (5,310 A.) | | | | | 33.0 (5,260 A.) | |
| 0.75 | | 30.7 (5,290 A.) | | | | 29.0 (5,300) | |
| 0.50 | | | 51.5(5,330 A.) | | | 41.2(5,320) | |
| 0.25 | | | | | 57.2(5,340 A.) | 48.2(5,350) | (5,350 A.) |
| 0 | | 26.2(5,420) | | 58.0(5,380 A.) | | 58.2(5,360) | 57.8(5,370) |

From Table I it will be seen that substituting $Mg^{+2}$ in $Zn_2GeO_4$ increases brightness under 2537 A. excitation, while it has the opposite effect in $Zn_2SiO_4$. In each case, the peak emission shifts slightly toward the blue end of the spectrum. The substitution of $Ge^{+4}$ for $Si^{+4}$ results in increased brightness and a shift in peak emission toward the red so that compositions high in germanium are quite yellow. When $Ge^{+4}$ and $Mg^{+2}$ are simultaneously substituted into $Zn_2SiO_4$, the germanium substitution is the dominant factor in determining the characteristics of the luminescent radiation. The brightest phosphors in this quaternary system including $Zn^{+2}$, $Mg^{+2}$, $Ge^{+4}$ and $Si^{+4}$ occur near the solid solution limit of $Mg_2GeO_4$ in $Zn_2GeO_4$.

Table II illustrates that the trends established with 2537 A. excitation are largely repeated in the case of cathode-ray excitation, the main difference being that for cathode-ray excitation a minimum in brightness occurs at about 25 mole percent $Ge^{+4}$ substitution for $Si^{+4}$. Thus, the desirable upper limit of $Si^{+4}$ substitution for $Ge^{+4}$ in phosphors of the present invention is 75 mole percent.

In the phosphors containing $Si^{+4}$, variations in the manganese concentration of about from 0.5 to 2.0 mole percent indicate that brightness is increasing as manganese increases to 2.0 mole percent and more. Under cathode-ray excitation there was a minimum brightness at 1.0 mole percent manganese which was not present under 2537 A. excitation.

Binary phosphors based on solid solutions of zinc orthogermanate and magnesium orthogermanate activated with manganese were prepared, without the $Si^{+4}$ of the previous examples. These phosphors were prepared as described above except that the final firing temperature was $1150 \pm 10°$ C. instead of 1200° C. Luminescence data for these compositions under 2537 A. and 3650 A. excitation and cathode-ray excitation are given respectively in Tables III, IV and V below as a function of atomic proportions of magnesium and manganese. In each case, the first entry is the brightness, and the second entry is the peak wavelength in angstrom units and is in parentheses. In Tables III and IV the brightness is given in percent of a standard $Zn_2GeO_4$:Mn phosphor, while in Table V the brightness is in foot-lamberts. The cathodoluminescent data on the binary phosphors was obtained with an anode potential of 16 kilovolts and a current density of 0.2 microampere per square centimeter.

brightness to a maximum at about 15 mole percent $Mg_2GeO_4$ at the 0.01 Mn level, with different results for other Mn levels. Most of the willemite solid solutions discussed here are about 40–50% brighter under 2537 A. excitation than standard $Zn_2SiO_4$:Mn certified by the National Bureau of Standards which has a brightness of 77% relative to the above-mentioned $Zn_2GeO_4$:$Mn_{0.01}$ standard.

Table IV shows that with 3650 A. excitation brightness generally tends to increase with Mn additions up to the 0.02 mole level.

FIG. 2 illustrates the improvements in brightness obtained in phosphors of the invention using data from Table VI with 2537 A. and 3650 A. excitation.

The compositions shown in Table VI were tested under 2537 A., 3650 A. and cathode-ray excitation, and the results are presented both in Table VI and in FIGS. 2 and 3. These data demonstrate that there is a decrease in brightness after a certain $Mn^{+2}$ concentration has been reached; this seems to be due to activator quenching. Peak emission shifts toward the red as manganese concentration increases under both 2537 A. and 3650 A. excitation.

As shown in Table VI, cathodoluminescent brightness constantly decreases, and the peak wavelength is constantly shifted toward the red as manganese is added within the limits of 0.01–0.10 to a phosphor having the basic composition $(Zn_{0.795-x}Mg_{0.20})_2GeO_4$:$Mn_{2x}$.

TABLE III.—2,537 A. EXCITATION

[Luminescence of $(Zn_{0.995-x-y}Mg_y)_2GeO_4$:$Mn_{2x}$ as a function of Mg (y) and Mn(x) concentrations—brightness and peak wavelength]

| | Values of y | | | | | |
|---|---|---|---|---|---|---|
| | 0 | 0.10 | 0.15 | 0.20 | 0.25 | 0.35 |
| Values of x: | | | | | | |
| 0.04 | 94.5%(5,420 A.) | 94.5%(5,440 A.) | 92.5%(5,415 A.) | 91%(5,420 A.) | 101%(5,410 A.) | 97.5%(5,395 A.) |
| 0.02 | 112.5(5,405) | 109(5,400) | 99(5,400) | 116(5,400) | 80.5(5,400) | 112(5,390) |
| 0.01 | 112(5,385) | 119(5,400) | 110(5,380) | 111(5,385) | 109(5,385) | 112(5,370) |
| 0.005 | 105.5(5,380) | 120.5(5,390) | 129(5,380) | 108.5(5,385) | 113(5,375) | 101.5(5,370) |

TABLE IV.—3,650 A. EXCITATION

[Luminescence of $(Zn_{0.995-x-y}Mg_y)_2GeO_4$:$Mn_{2x}$ as a function of Mg (y) and Mn (x) concentrations—brightness and peak wavelength]

| | Values of y | | | | | |
|---|---|---|---|---|---|---|
| | 0 | 0.10 | 0.15 | 0.20 | 0.25 | 0.35 |
| Values of x: | | | | | | |
| 0.04 | 164%(5,430 A.) | 116%(5,440 A.) | 81%(5,420 A.) | 65%(5,430 A.) | 60%(5,425 A.) | 28%(5,425 A.) |
| 0.02 | 170(5,400) | 108(5,415) | 74(5,400) | 80(5,400) | 30(5,420) | 28(5,405) |
| 0.01 | 113.5(5,405) | 85(5,425) | 61(5,405) | 48(5,410) | 35(5,420) | 16(5,415) |
| 0.005 | 100(5,450) | 65(5,420) | 54(5,410) | 38(5,420) | 27(5,420) | 11(5,430) |

TABLE V.—CATHODE-RAY EXCITATION

[Luminescence of $Zn_{0.995-x-y}Mg_y)_2GeO_4$:$Mn_{2x}$ as a function of Mg (y) and Mn (x) concentrations—brightness and peak wavelength]

| | Values of y | | | | | |
|---|---|---|---|---|---|---|
| | 0 | 0.10 | 0.15 | 0.20 | 0.25 | 0.35 |
| Values of x: | | | | | | |
| 0.04 | [1] 8.7 ft.l.(5,450 A.) | [2] 14.9 ft.l. (5,415 A.) | 13.8 ft.l. (5,415 A.) | 12.9 ft.l. (5,420 A.) | 15.3 ft.l. (5,400 A.) | 14.3 ft.l. (5,400 A.) |
| 0.02 | 19.6(5,380) | 17.9(5,390) | 18.1(5,390) | 10.1(5,430) | 16.4(5,405) | 21.0(5,370) |
| 0.01 | 12.2(5,380) | 21.9(5,370) | 19.7(5,380) | 20.0(5,370) | 19.9(5,365) | 19.8(5,360) |
| 0.005 | 15.5(5,375) | 20.2(5,365) | 25.3(5,370) | 23.8(5,365) | 22.6(5,360) | 21.8(5,340) |

[1] Burned severely.
[2] Burned slightly.

Figure 1:
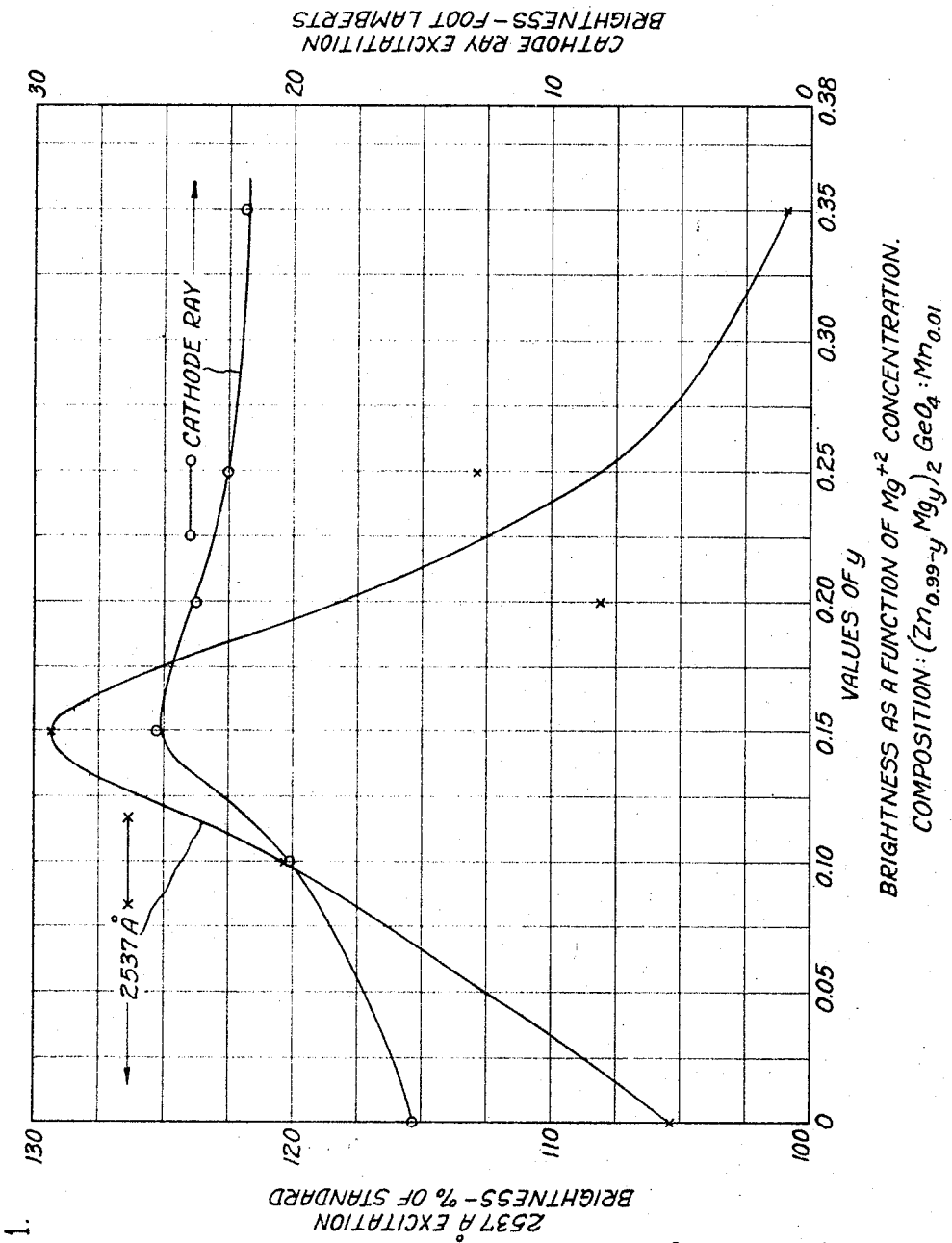

FIG. 1 illustrates the sharp increase in brightness from substituting at least 10 atom percent Mg for Zn in $Zn_2GeO_4$:$Mn_{0.01}$. This data is taken from Tables III and V.

As shown in Tables III and V, the composition having optimum brightness under 2537 A. and cathode-ray excitation is $(Zn_{0.84}Mg_{0.15})GeO_4$:$Mn_{0.01}$. With 2537 A. excitation, the peak emission of the sample is at 5380 A. and the brightness is 129% relative to a sample of $Zn_2GeO_4$:$Mn_{0.01}$ used as a standard. In response to cathode-ray excitation, the peak wavelength of the sample is 5370 A. with a brightness of 23.3 foot-lamberts. Additions of magnesium orthogermanate cause increases in

TABLE VI

[Luminescence of $(Zn_{0.795-x}Mg_{0.20})_2GeO_4$:$Mn_{2x}$ as a function of manganese concentration]

| | Excitation | | |
|---|---|---|---|
| | 3,650 A. | 2,537 A. | Cathode ray |
| Values of x: | | | |
| 0.01 | 48% (5,415 A.) | 116% (5,390 A.) | 20.8 ft.l. (5,370 A.) |
| 0.02 | 56 (5,430) | 106 (5,410) | 17.8 (5,390) |
| 0.04 | 88 (5,420) | 109 (5,415) | 15.1 (5,415) |
| 0.06 | 58 (5,450) | 65 (5,450) | 10.0 (5,450) |
| 0.10 | 34 (5,470) | 31 (5,470) | 4.3 (5,490) |

The optimum phosphor under excitation by cathode rays and by 2537 A. ultraviolet light is $$(Zn_{0.84}Mg_{0.15})_2GeO_4:Mn_{0.01}$$

Under 2537 A. excitation, this phosphor has a peak wavelength of 5380 A. and a brightness of 129% of a standard $Zn_2GeO_4$:Mn. Under cathode rays it has a peak wavelength of 5370 A. and a brightness of 25.3 foot-lamberts.

What we claim as new and desire to secure by Letters Patent of the United States is:

1. Luminescent material consisting essentially of a composition having the formula $$(Zn_{a-x-y}Mg_y)_2(Ge_{1-z}Si_z)O_4:Mn_{2x}$$

wherein:
  $a$ is in the range of about 0.95–1.0,
  $x$ is in activator proportions,
  $y$ is in the range of about 0.10–0.38, and
  $z$ is in the range of about 0–0.75.

2. Luminescent material according to claim 1 in which $x$ is in the range of about 0.005–0.04.

3. Luminescent material according to claim 2 consisting essentially of a composition having the formula $$(Zn_{a-x-y}Mg_y)_2GeO_4:Mn_{2x}$$

wherein:
  $a$ is in the range of about 0.95–1.0,
  $x$ is in the range of about 0.005–0.04, and
  $y$ is in the range of about 0.10–0.38.

4. Luminescent material according to claim 3 consisting essentially of a composition having the formula $$(Zn_{0.84}Mg_{0.15})_2GeO_4:Mn_{0.01}$$

References Cited

UNITED STATES PATENTS 2,457,054  12/1948  Leverenz.
2,447,449  8/1948  Williams.

TOBIAS E. LEVOW, Primary Examiner

R. D. EDMONDS, Assistant Examiner